Jan. 18, 1938.  K. M. LEE  2,106,009
COOKY MOLDING DEVICE
Filed Nov. 2, 1936
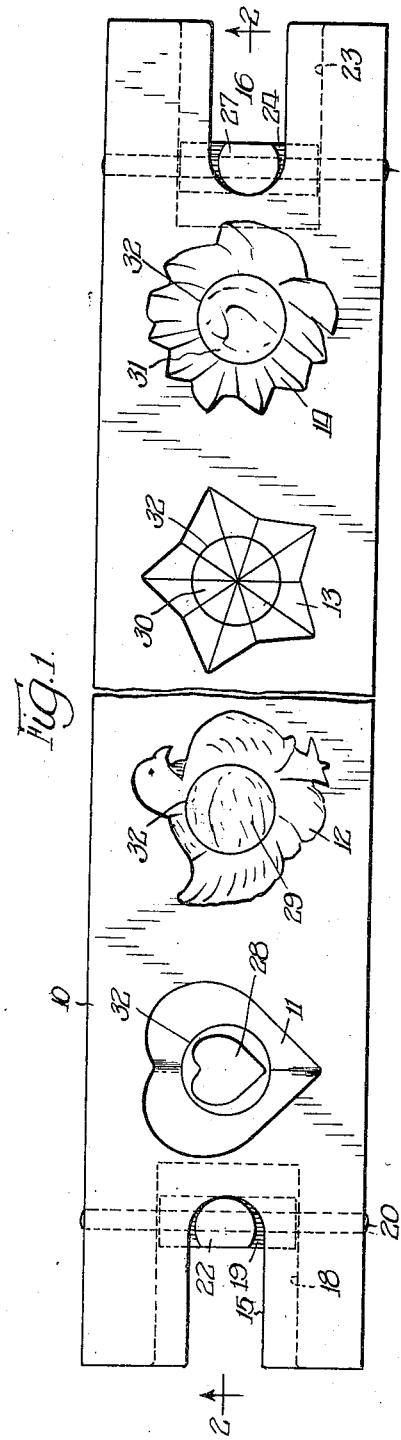
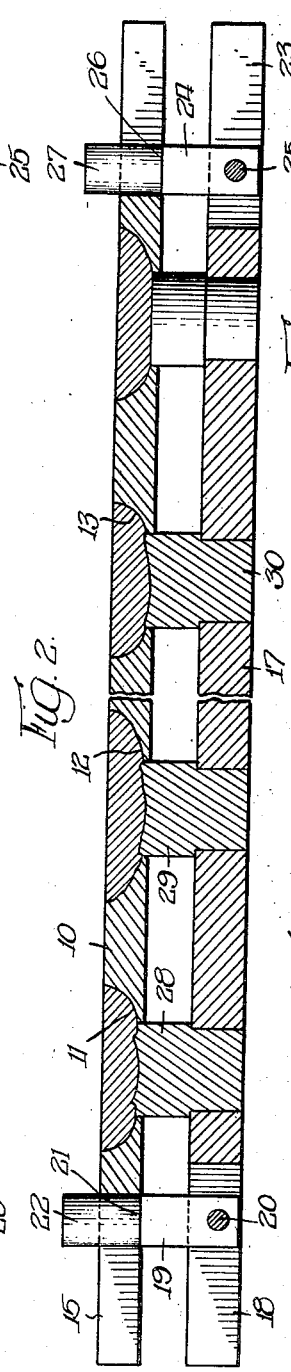
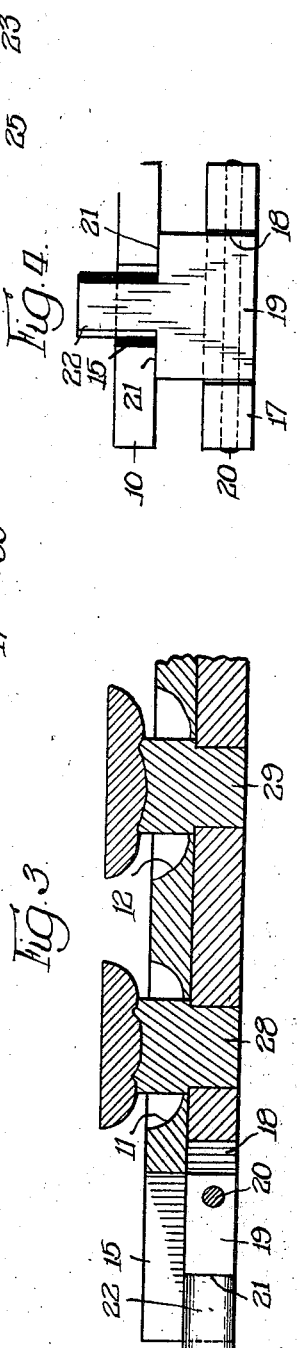
Inventor:
Harrington M. Lee,
By Cromwell, Greist + Warden
Attys Patented Jan. 18, 1938

2,106,009

UNITED STATES PATENT OFFICE 2,106,009

COOKY MOLDING DEVICE

Karrington M. Lee, Chicago, Ill.

Application November 2, 1936, Serial No. 108,796

2 Claims. (Cl. 107—19)

The present invention relates to producing molded articles and has reference in particular to an improved device for producing a plurality of individual and preferably differently shaped serving portions of materials such as cookies.

A principal object of the invention is to provide an improved device whereby a plurality of relatively small portions of dough can be molded into the desired form and extruded from the mold in a finished manner.

An additional object is to provide improved mold-extruding means for operation upon a plurality of formed masses.

These and other objects will be evident upon a consideration of the following specification and by reference to the accompanying drawing, in which Fig. 1 is a top view of a mold constructed in accordance with the invention;

Fig. 2 is a longitudinal sectional view taken along line 2—2 of Fig. 1;

Fig. 3 is a fragmentary sectional view similar to Fig. 2 and showing the mold in extruded position; and Fig. 4 is an end view of the device.

In the serving of cookies in restaurants, hotels and homes it is customary to divide the dough into relatively small servings of a size suitable for individual consumption. From the aesthetic standpoint it is more desirable that the individual servings of the cookies be formed into designs which may vary widely in their shapes. In accordance with the present invention there is provided a device whereby designs of this nature may be produced rapidly in such a manner as to provide well shaped masses.

As shown in the drawing there is provided a longitudinally extending mold carrier 10 which may be composed of a material such as wood. The mold carrier is cut to provide a plurality of designs extending as shown in Fig. 1, the designs being indicated at 11, 12, 13 and 14. It will be observed that the mold 11 is in the shape of a heart, while the mold 12 is shaped to produce a fowl. Molds 13 and 14 are of still different shapes, although if desired all of the molds may be of a similar nature. At the end of the mold carrier 10 adjacent the mold 11 is provided a cut-away slot indicated at 15 which extends inwardly of the carrier. A similar slot 16 is provided at the opposite end of the mold carrier.

The mold carrier is mounted above a base member 17 which may be constructed of the same material as the mold carrier. This base member is cut away below the slot 15 as shown at 18 and pivotally mounted in the slot or opening 18 is a supporting block 19. This block is provided with a pin 20 which also extends through the base 17 as shown in dotted lines in Fig. 1. The supporting member 19 is provided with shoulder portions 21 and an upwardly extending round portion 22 of reduced size. The portion 22 extends upwardly through the slot 15 and acts to position the mold carrier 10, the latter being adapted to rest on the shoulders 21 in the manner shown in Fig. 2 when the support member 19 is in inverted position.

At its opposite end the base 17 is provided with a cut away portion 23 in which the support 24 is pivotally mounted by means of a pin 25, the latter extending through the base as shown in Fig. 1. The support 24 is provided with a shoulder portion 26 which is similar in construction and operation to the shoulder portion 21, and a reduced centering member 27 extends upwardly from the shoulder 26 and is received by the slot 16.

Between the supports 19 and 24 are provided a plurality of stationary upstanding extruding members 28, 29, 30 and 31, these members respectively being positioned beneath the molds 11 to 14. The molds 11 to 14 are cut away in their central portions as shown at 32 to provide means whereby the extruding members may pass upwardly through the molds. In the modification shown in the drawing the openings 32 are shown as being round, although in some cases it may be desirable to depart from this particular shape. The extruding members 28 to 31 are of such height as to pass slightly above the bottom of the mold carrier 10 when the mold carrier is positioned on the supporting members 19 and 24, as shown in Fig. 2. Preferably, the tops of the extruding members are carved in accordance with the design of the molds. That is, a part of the finished shape of the molded masses is provided by the upper end of the extrusion members.

In operating the device the supports 19 and 24 are placed in vertical position and the mold carrier is positioned as shown in Fig. 2. Thereafter, the dough to be molded is forced into the molds and the upper surface of the dough in the molds preferably is leveled off as by means of a knife or scraper. Then, to complete the operation the upwardly extending members 22 and 27 are grasped and rotated outwardly, whereby the mold carrier 10 is lowered into the position shown in Fig. 3. During the downward movement of the mold carrier the extruding members 28 to 31 retain the molded masses on their upper ends as shown in Fig. 3, thereby withdrawing the molded portions from the molds. When the masses are suspended on the tops of the extruding members as shown in Fig. 3 they usually may be removed without damage, as by turning the mold over or by manually lifting the molded masses from the extrusion members. After removal of the molded portions, the support members 19 and 24 again may be raised to position the mold carrier as shown in Fig. 2, whereupon additional dough may be placed in the molds and the operations repeated.

The positioning of a plurality of molds in the manner described along the longitudinal mold carrier facilitates the pressing of the dough to be molded into the molds and permits the rapid producion of molded articles. By means of the mechanism whereby the mold carrier quickly is raised and lowered with respect to the extrusion members, the entire operation is made simple, economical and rapid. While the invention has been described with respect to the molding of cookies, it will be understood that other materials, such as butter, may be treated in a like manner. Also, it will be recognized that changes may be made in the structure described herein for purposes of illustration and exemplification without departing from the scope of the invention. Such changes are intended to be included in the appended claims.

I claim:

1. In a device of the type described, a base member having spaced supporting members pivotally mounted thereon, shoulders on said supports, centering members extending upwardly from said shoulders, a mold carrier having slotted ends adapted to rest on said shoulders and to receive said centering members, a mold on said mold carrier and extrusion members on said base member adapted to extend through said mold.

2. In a device of the type described, a base having upstanding extrusion members rigidly attached thereto, a mold carrier adapted to receive said extrusion members, and rotatable mold spacing members pivotally mounted to said base, said mold spacing members having means for positioning the mold carrier with respect to said extrusion element.

KARRINGTON M. LEE.